United States Patent
Yamada et al.

(10) Patent No.: US 8,175,417 B2
(45) Date of Patent: May 8, 2012

(54) APPARATUS, METHOD, AND COMPUTER-READABLE RECORDING MEDIUM FOR PIXEL INTERPOLATION

(75) Inventors: Kohji Yamada, Kawasaki (JP); Mari Iwasaki, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 517 days.

(21) Appl. No.: 12/385,708

(22) Filed: Apr. 16, 2009

(65) Prior Publication Data

US 2009/0324136 A1    Dec. 31, 2009

(30) Foreign Application Priority Data

Jun. 27, 2008    (JP) .................................. 2008-168952

(51) Int. Cl.
*G06K 9/32*    (2006.01)

(52) U.S. Cl. ........ 382/300; 382/199; 382/266; 382/269; 382/275; 382/299; 358/525

(58) Field of Classification Search .................. 382/300, 382/199, 266, 269, 275, 299; 358/525
See application file for complete search history.

(56) References Cited

U.S. PATENT DOCUMENTS

| | | | |
|---|---|---|---|
| 5,991,464 A * | 11/1999 | Hsu et al. | 382/300 |
| 6,714,693 B1 * | 3/2004 | Miyake | 382/300 |
| 6,760,489 B1 | 7/2004 | Kuwata | |
| 6,782,143 B1 * | 8/2004 | Dube et al. | 382/300 |
| 6,832,009 B1 * | 12/2004 | Shezaf et al. | 382/300 |
| 7,126,643 B2 * | 10/2006 | Song et al. | 348/448 |
| 2002/0146180 A1 | 10/2002 | Hirakoso | |
| 2005/0036711 A1 | 2/2005 | Abe | |
| 2005/0094899 A1 * | 5/2005 | Kim et al. | 382/300 |
| 2009/0028465 A1 * | 1/2009 | Pan | 382/300 |

FOREIGN PATENT DOCUMENTS

| | | |
|---|---|---|
| EP | 1 347 410 A2 | 9/2003 |
| JP | 2000-151990 | 5/2000 |
| JP | 2002-101296 | 4/2002 |
| JP | 2004-96715 | 3/2004 |

(Continued)

OTHER PUBLICATIONS

Shezaf N. et al., "Adaptive low complexity algorithm for image zooming at fractional scaling ratio", Electrical and Electronic Engineers in Israel, 2000, The 21$^{st}$ IEEE Convention of the Apr. 11-12, 2000, Piscataway, NJ, Apr. 11, 2000, pp. 253-256.

(Continued)

*Primary Examiner* — Wesley Tucker
*Assistant Examiner* — Mark Roz
(74) *Attorney, Agent, or Firm* — Staas & Halsey LLP

(57) ABSTRACT

A disclosed pixel interpolation apparatus for converting an image to a predetermined resolution includes a first interpolating part configured to calculate a first interpolation pixel value by performing high order interpolation using pixel values of plural first reference pixels and a distance between the plural first reference pixels and a first interpolation pixel; a second interpolating part configured to calculate a second interpolation pixel value by performing weighted interpolation using pixel values of plural second reference pixels, an edge gradient of the second reference pixels, and the distance between the second reference pixels and a second interpolation pixel; an overshoot area detecting part configured to detect an overshoot area in the image; and an interpolation pixel selecting part configured to determine whether to perform the high order interpolation or the weighted interpolation according to a detection result of the overshoot area detecting part.

5 Claims, 10 Drawing Sheets

FOREIGN PATENT DOCUMENTS

| | | |
|---|---|---|
| JP | 2005-63197 | 3/2005 |
| JP | 2005-107437 | 4/2005 |

OTHER PUBLICATIONS

Y. Ohmiya, et al, "A Method for High Precision Enlargement for Pictures taken by Cellular Phone on a Personal Computer", Proceedings of International Conference on Computing, Communication and Control Technologies, 2004, Austin, Texas, pp. 30-35.

European Search Report dated Jul. 14, 2010 issued in corresponding European Patent Application 09005421.4.

"Handbook of Image Analysis [Revised Edition]" (supervising Editors, Mikio Takagi, Haruhisa Shimoda, Sep. 10, 2004, University of Tokyo Press) pp. 1360-1373.

Liu Heng, "Bitmap Imaged Direct RGB Edge Extraction Based on Gradient", Journal of Southwest University of Science and Technology, vol. 17, Period 4, Dec. 31, 2002.

Chinese Office Action issued Mar. 22, 2011 in corresponding Chinese Patent Application 200910136324.7.

Japanese Office Action dated Jan. 24, 2012 issued in corresponding Japanese Patent Application No. 2008-168952.

\* cited by examiner

FIG.2A

| 0 | -1 | 0 |
|---|---|---|
| -1 | 4 | -1 |
| 0 | -1 | 0 |

FIG.2B

| 0 | 0 | 0 |
|---|---|---|
| -1 | 2 | -1 |
| 0 | 0 | 0 |

FIG.2C

| 0 | -1 | 0 |
|---|---|---|
| 0 | 2 | 0 |
| 0 | -1 | 0 |

FIG.3A

| 0  | 0 | 0 |
|----|---|---|
| -1 | 1 | 0 |
| 0  | 0 | 0 |

| 0 | 0  | 0 |
|---|----|---|
| 0 | -1 | 1 |
| 0 | 0  | 0 |

FIG.3B

| 0 | -1 | 0 |
|---|----|---|
| 0 | 1  | 0 |
| 0 | 0  | 0 |

| 0 | 0  | 0 |
|---|----|---|
| 0 | -1 | 0 |
| 0 | 1  | 0 |

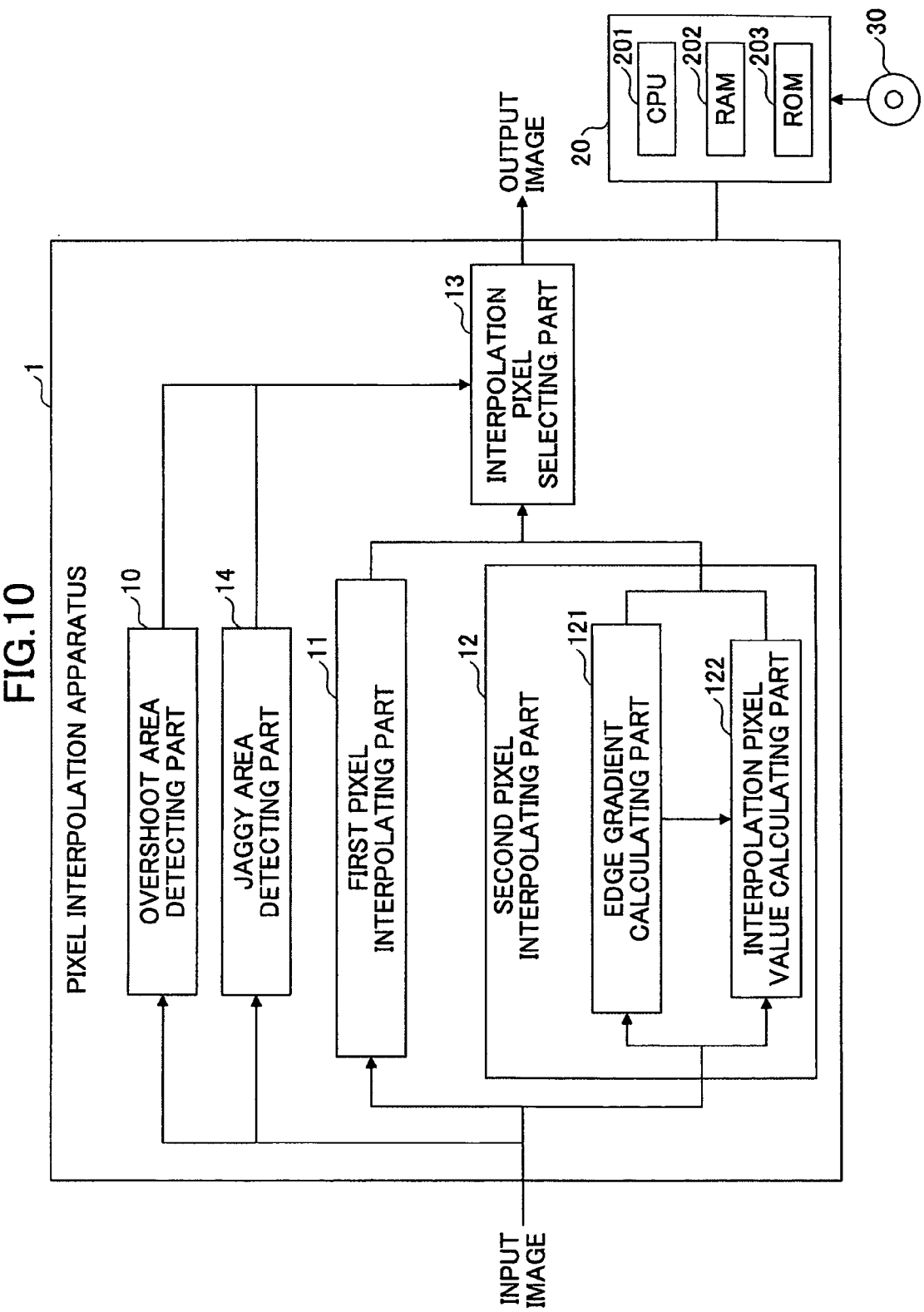

APPARATUS, METHOD, AND COMPUTER-READABLE RECORDING MEDIUM FOR PIXEL INTERPOLATION

CROSS-REFERENCE TO RELATED APPLICATIONS

This application is based upon and claims the benefit of priority of the prior Japanese Patent Application No. 2008-168952 filed on Jun. 27, 2008, the entire contents of which are incorporated herein by reference.

FIELD

The embodiments discussed herein are related to a technology for pixel interpolation by which an image is converted to a predetermined resolution.

BACKGROUND

In recent years, there has been a demand for larger and thinner displays along with the spread of digital broadcasting. In response to such demand, flat panel displays such as liquid crystal displays and plasma displays are being developed and are proliferating. In flat panel displays, since the number of pixels is fixed according to the panel, it is necessary to perform resolution conversion and generate interpolation pixels in a case where the input image and panel resolutions differ.

According to "Handbook of Image Analysis [Revised Edition]" (Supervising Editors, Mikio Takagi, Haruhisa Shimoda, Sep. 10, 2004, University of Tokyo Press), there are pixel interpolation methods such as a nearest neighbor interpolation method which uses a reference pixel nearest to an interpolation pixel as the interpolation pixel value, a bilinear interpolation method which calculates an interpolation pixel value with weighted added distance by using pixel values of four points surrounding an interpolation pixel, and a cubic convolution method which calculates an interpolation pixel value with weighted distance by using pixel values of four points surrounding an interpolation pixel.

In Japanese Laid-Open Patent Publication No. 2005-107437, an interpolation pixel value is calculated by extracting a sharp edge area by a neighboring pixel difference, performing bilinear pixel interpolation with respect to the sharp edge area, performing cubic convolution with respect to other areas, and adding the weighted interpolation pixel value obtained by the bilinear pixel interpolation and the weighted interpolation pixel value obtained by the cubic convolution with respect to a boundary area. In Japanese Laid-Open Patent Publication No. 2004-96715, pixel interpolation is performed by selecting a pixel interpolation method such as the nearest neighbor interpolation method or the cubic convolution method according to number of colors of an image, edge strength of an image, or sharpness of an image. In Japanese Laid-Open Patent Publication No. 2002-101296, pixel interpolation is performed by using a bilinear interpolation function as one interpolation function and using a cubic convolution function as the other interpolation function. In Japanese Laid-Open Patent Publication No. 2000-151990, pixel interpolation is performed by using bilinear interpolation in a case where color is skin color or sky-blue color and using cubic convolution in other cases.

SUMMARY

According to an aspect of the invention, there is provided a pixel interpolation apparatus for converting an image to a predetermined resolution, the apparatus including: a first interpolating part configured to calculate a first interpolation pixel value by performing high order interpolation using pixel values of a plurality of first reference pixels and a distance between the plural first reference pixels and a first interpolation pixel; a second interpolating part configured to calculate a second interpolation pixel value by performing weighted interpolation using pixel values of a plurality of second reference pixels, an edge gradient of the second reference pixels, and the distance between the second reference pixels and a second interpolation pixel; an overshoot area detecting part configured to detect an overshoot area in the image; and an interpolation pixel selecting part configured to determine whether to perform the high order interpolation or the weighted interpolation according to a detection result of the overshoot area detecting part.

The object and advantages of the invention will be realized and attained by means of the elements and combinations particularly pointed out in the claims.

It is to be understood that both the foregoing general description and the followed detailed description are exemplary and explanatory and are not restrictive of the invention, as claimed.

BRIEF DESCRIPTION OF DRAWINGS

FIGS. 2A-2C illustrate examples of edge detecting filters;

FIGS. 3A and 3B illustrate examples of edge gradient detection filters;

FIG. 10 is a schematic diagram illustrating a configuration of a pixel interpolation apparatus according to a third embodiment of the present invention.

DESCRIPTION OF EMBODIMENTS

Figure 1:
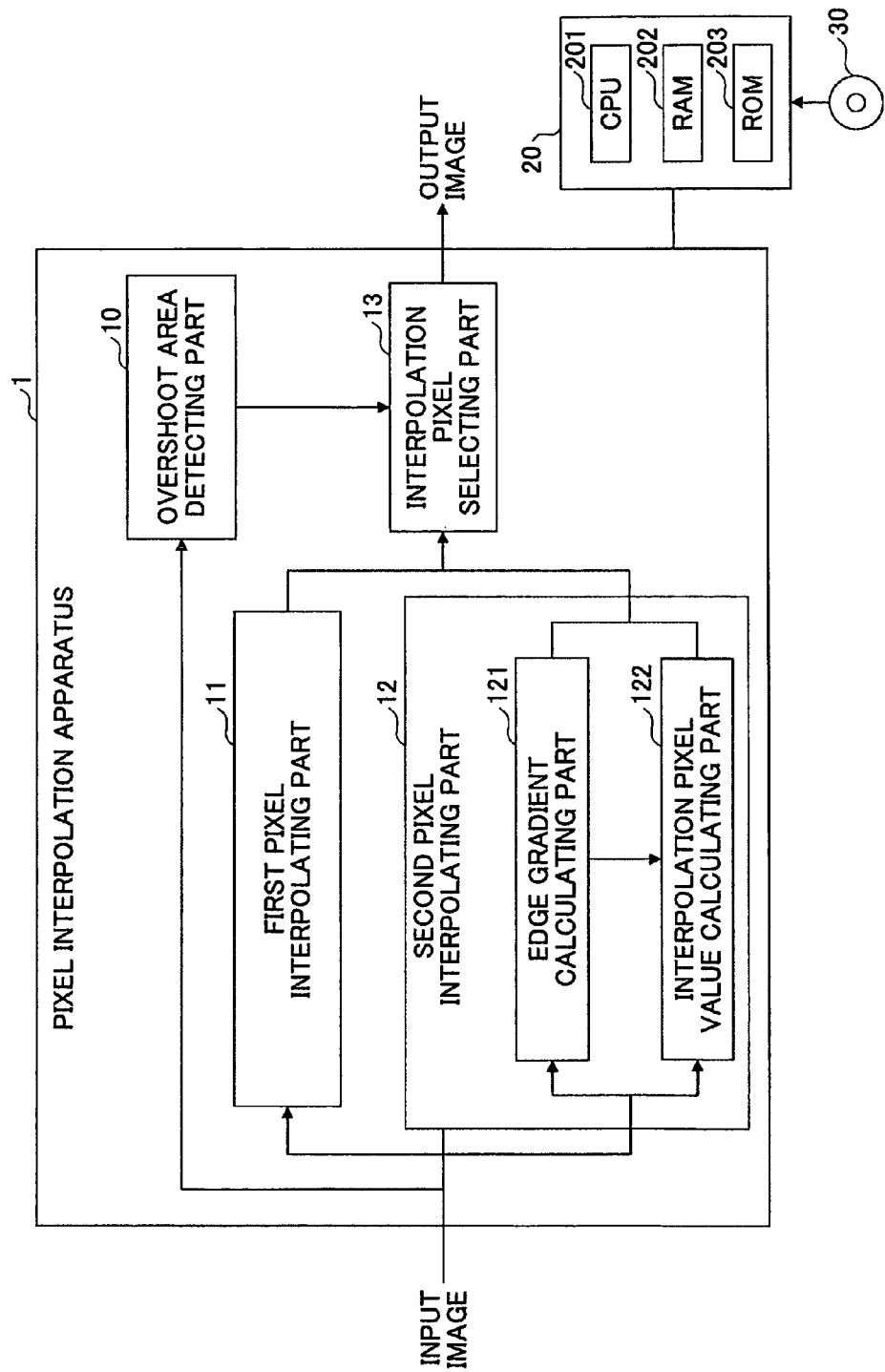
FIG. 1 is a schematic diagram illustrating a configuration of a pixel interpolation apparatus according to a first embodiment of the present invention.

The nearest neighbor interpolation method does not calculate an interpolation pixel value from plural interpolation reference pixels but rather obtains an interpolation pixel value from an interpolation reference pixel that is nearest to an interpolation pixel position. Therefore, although the workload for performing this interpolation method may be small, jaggies may appear at diagonal edge parts because pixel values inconsistently change at a boundary of an edge part. This results in a problem of degradation of image quality.

With the bilinear interpolation method, less overshoot and jaggies appear at the vicinity of an edge part because an interpolation pixel value is calculated by weighting a reference pixel with a distance between an interpolation pixel and an interpolation reference pixel. However, in a case where the size of an image is reduced, jaggies tend to appear unless being processed with a low pass filter. In a case where the size of an image is increased, the image becomes blurry as the angle of an edge usually becomes moderate.

The cubic convolution method calculates an interpolation pixel value by obtaining approximation curves from sixteen pixels surrounding an interpolation pixel considering even third differentiation (first, second, and third order). Accordingly, overshoot and undershoot appear at the vicinity of sharp edge parts. This results in a problem of degradation of image quality.

In Japanese Laid-Open Patent Publication No. 2005-107437, an interpolation pixel value is calculated by performing bilinear interpolation with respect to a sharp edge area, performing cubic convolution with respect to a moderate area, and performing weighted addition between interpolation values obtained by bilinear interpolation and cubic convolution with respect to a boundary area between the sharp edge area and the moderate area. With the method disclosed in Japanese Laid-Open Patent Publication No. 2005-107437, although overshoot may be less likely to occur at sharp areas, there is increased blur caused by the bilinear interpolation. Further, in a case where weighting of the bilinear interpolation is increased for preventing overshoot at the boundary area, blur is increased. On the other hand, overshoot increases in a case where weighting of the cubic convolution is increased for reducing the blur.

In Japanese Laid-Open Patent Publication No. 2004-96715, the pixel interpolation method is selected according to number of colors of an image, edge strength of an image, or sharpness of an image. However, since the nearest neighbor interpolation method or the cubic convolution method is selected as the pixel interpolation method to be used, it is difficult to prevent image degradation due to generation of jaggies and overshoot.

In Japanese Laid-Open Patent Publication No. 2002-101296, since the bilinear interpolation method and the cubic convolution are used for one of the interpolation functions of an interpolation pixel, it is difficult to prevent image degradation due to blur caused by the bilinear interpolation method and overshoot/undershoot caused by the cubic convolution method.

In Japanese Laid-Open Patent Publication No. 2000-151990, skin color areas and sky blue color areas are extracted from chirominance components and bilinear interpolation is performed with respect to the skin color areas and the sky-blue color areas for preventing noise from being highlighted (emphasized) whereas a cubic convolution process is performed with respect to other areas. Thereby, roughness that is noticeable in human skin or the sky can be reduced. Furthermore, overshoot or undershoot may appear at sharp edges in areas other than the skin color area or the sky-blue color area. This results in a problem of degradation of image quality.

In the following, embodiments of the present invention are described with reference to the accompanying drawings.

First Embodiment

The first embodiment is a configuration that detects areas of an input image where overshoot is generated and switches between an interpolation process using high order interpolation calculation (e.g., cubic convolution process) and an interpolation process using weighted interpolation (e.g., sharpening bilinear interpolation process) with respect to each area of the input image according to the detection result. The sharpening bilinear interpolation process is a newly devised interpolation process (described in detail below).

FIG. 1 is a schematic diagram illustrating a configuration of a pixel interpolation apparatus according to the first embodiment of the present invention.

In FIG. 1, the pixel interpolation apparatus 1 includes an overshoot area detecting part 10, a first pixel interpolating part 11, a second pixel interpolating part 12, and an interpolation pixel selecting part 13. Although the parts 10-13 of the pixel interpolation apparatus 1 are realized by electronic circuits, the parts 10-13 may be realized by a computer program executed with hardware resources of a computer 20 such as a CPU (Central Processing Unit) 201, a RAM (Random Access Memory) 202, a ROM (Read Only Memory) 203.

The overshoot area detecting part 10 detects an area of an input image determined to generate overshoot (overshoot area) in a case where an interpolation process using high order interpolation calculation (e.g., cubic convolution process) is performed on the input image. The overshoot area detecting part 10 calculates edge strength with respect to each pixel and determines which area of the input image is the overshoot area. In this embodiment, if the edge strength of any one of interpolation reference pixels surrounding an interpolation area (interpolation pixel) has an absolute value no less than a predetermined threshold, the interpolation area is determined as the overshoot area. In other words, if the edge strength of a reference pixel neighboring an interpolation pixel is no less than a predetermined threshold, the interpolation pixel is determined to be included in the overshoot area. On the other hand, if the edge strength of all of the reference pixels neighboring an interpolation pixel is no greater than a predetermined threshold, the interpolation pixel is determined to be not included in the overshoot area.

The calculation of edge strength by the overshoot area detecting part 10 is a filtering process which assumes a pixel exhibiting a sharp gradient (overshoot) has a large absolute value. Examples of edge detecting filters are illustrated in FIGS. 2A, 2B, and 2C. The edge filter of FIG. 2A is used in a case where edge direction is not considered. The edge filters in FIGS. 2B and 2C are used in a case where edge strength is calculated with respect the vertical and horizontal directions, respectively. The edge filter illustrated in FIG. 2B is used in calculating edge strength with respect to a horizontal direction. The edge filter illustrated in FIG. 2C is used in calculating edge strength with respect to a vertical direction. In a case of taking edge direction into consideration, an area having a horizontal edge strength with an absolute value no less than a predetermined threshold is determined as the overshoot area in a case where interpolation is performed with respect to the horizontal directions and an area having a vertical edge strength with an absolute value no less than a predetermined threshold is determined as the overshoot area when performing interpolation in the vertical direction.

Returning to FIG. 1, the first pixel interpolating part 11 performs a high order interpolation process such as a cubic convolution process. Thereby, a value of an interpolation pixel (interpolation pixel value) is obtained by using the pixel values of the reference pixels surrounding the interpolation pixel and the distances from the interpolation pixel to the reference pixels. In the cubic convolution process, assuming that $f(p-1)$, $f(p)$, $f(p+1)$, and $f(p+2)$ represent the pixel values of the reference pixels (p being an integer satisfying a relationship of p<x<p+1 with respect to x axis coordinates of the interpolation pixel), the interpolation pixel value g (x) would be as follows:

$$g(x)=c((p-1)-x) \times f(p-1)+c(p-x) \times f(p)+c((p+1)-x) \times f(p+1)+c((p+2)-x) \times f(p+2).$$

However, it is assumed that:

$$c(t)=1-2|t|^2+|t|^3 (0\leq|t|<1) 4-8|t|+5|t|2-|t|3 (1\leq|t|<2) 0 (2\leq|t|)$$

The second pixel interpolating part 12 includes an edge gradient calculating part 121 and an interpolation pixel value calculating part 122. The second pixel interpolating part 12 performs weighted interpolation. For example, the second pixel interpolating part 12 performs the sharpening bilinear interpolation process in which an interpolation process steeper than a regular bilinear interpolation process is performed.

The edge gradient calculating part 121 calculates an edge gradient with respect to an interpolation direction of reference pixels by using edge gradient detection filters (edge gradient detection filter in the horizontal direction, edge gradient detection filter in the vertical direction) as illustrated in FIGS. 3A and 3B and outputs the calculated edge gradient to the interpolation pixel calculating part 122.

Figure 4:
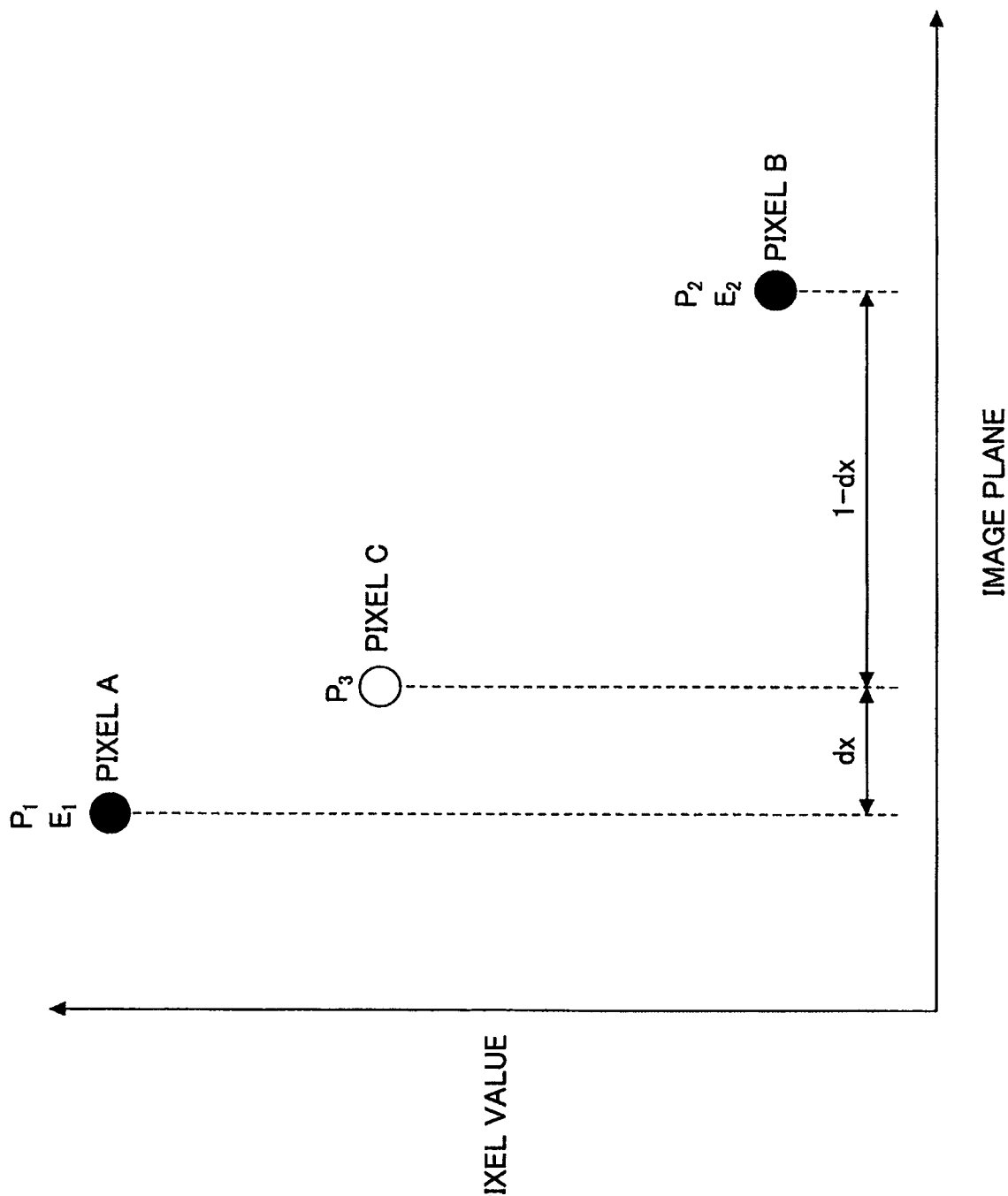
FIG. 4 is a schematic diagram for describing values used in calculating a pixel value of an interpolation pixel with a sharpening bilinear interpolation process according to an embodiment of the present invention.

The interpolation pixel calculating part 122 calculates an interpolation pixel value by using the edge gradient output from the edge gradient calculating part 121 and the pixel values of reference pixels. With reference to FIG. 4, assuming that "pixel C" represents an interpolation pixel, "pixel A" and "pixel B" represent reference pixels having the interpolation pixel C interposed therebetween, "$P_1$" represents a pixel value of the reference pixel A, "$P_2$" represents a pixel value of the reference pixel B, "$P_3$" represents a pixel value of the interpolation pixel C, "$E_1$" represents an absolute value of the edge gradient of the reference pixel A, "$E_2$" represents an absolute value of the edge gradient of the reference pixel B, and "dx" represents a ratio between the distance between the reference pixel A and the reference pixel B and the distance between the reference pixel A and the interpolation pixel C, the pixel value $P_3$ of the interpolation pixel C is calculated with the following formula.

$$P_3 = \frac{P_1 \times (1-dx) \times E_2 + P_2 \times dx \times E_1}{(1-dx) \times E_2 + dx \times E_1} \quad \text{[Formula 1]}$$

Returning to FIG. 1, the interpolation pixel selecting part 13 selects an interpolation process from the first pixel interpolating part 11 or the second pixel interpolating part 12 according to the detection result of the overshoot area detecting part 10. That is, in a case where the interpolation pixel is detected in an overshoot area, the interpolation pixel selecting part 13 selects an interpolation pixel interpolated by sharpening bilinear interpolation by the second pixel interpolating part 12. In a case where the interpolation pixel is not detected in the overshoot area, the interpolation pixel selecting part 13 selects an interpolation pixel interpolated by cubic convolution by the first pixel interpolating part 11.

In the pixel interpolation apparatus 1 illustrated in FIG. 1, two pixel interpolation processes are performed on the input image in parallel by the first and second pixel interpolating parts 11 and 12 to allow the interpolation pixel selecting part 13 to select an interpolation result from the first or second pixel interpolating parts 11 and 12. Alternatively, the interpolation pixel selecting part 13 may select an interpolation process beforehand and allow the selected interpolation process to be continued.

Figure 5:
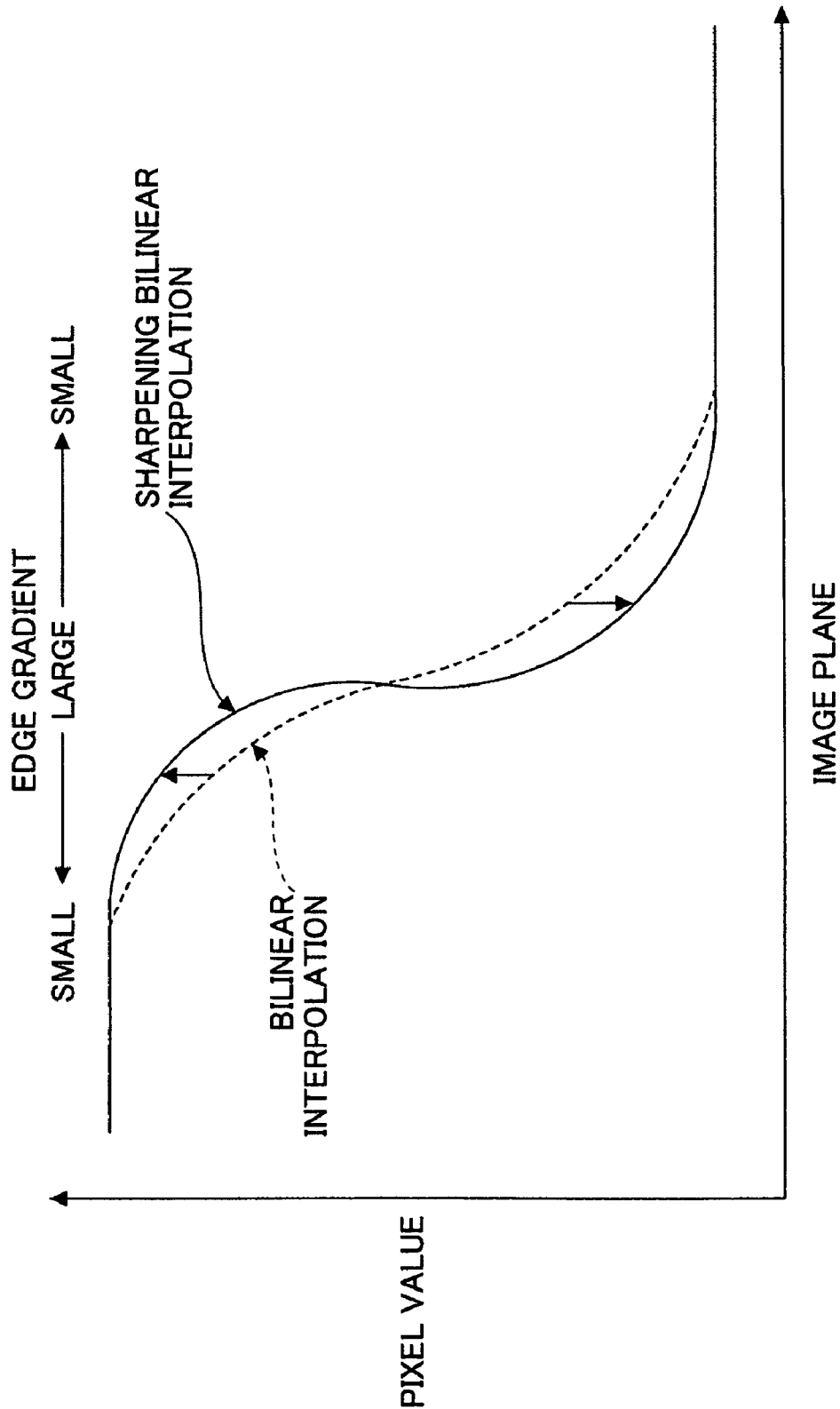
FIG. 5 is a schematic diagram illustrating a manner in which an edge becomes steep by performing a sharpening bilinear interpolation process according to an embodiment of the present invention.

In a case where an interpolation process using high order interpolation (e.g., cubic convolution) is performed with respect to an area having edge strength with a large absolute value, overshoot occurs. Thereby, contours that neighbor the edge parts become visible and are recognized as degradation of image quality. Therefore, by performing the sharpening bilinear interpolation with respect to an area having edge strength with a large absolute value, overshoot can be restrained and degradation of image quality can be prevented. As illustrated in FIG. 5, the absolute value of an edge gradient of a typical edge is large in the vicinity of the center of the edge and becomes smaller the farther away from the center of the edge. Because the weight of the pixels having edge gradient with a small absolute value is increased in a case where the sharpening bilinear interpolation is performed, the edge parts become steep (large gradient) compared to a typical bilinear interpolation process as illustrated in FIG. 5. Therefore, overshoot by the high order interpolation process in the overshoot area can be restrained while pixel interpolation that is significantly sharper than the typical bilinear interpolation can be performed.

Furthermore, the absolute values of edge gradients with respect to the horizontal direction and the vertical direction may be compared, so that the first pixel interpolating part 11 can perform cubic convolution with respect to the direction having an edge gradient with a smaller absolute value and the second pixel interpolating part 12 can perform the sharpening bilinear interpolation with respect to the direction having an edge gradient with a larger absolute value. Alternatively, an interpolation pixel obtained by performing cubic convolution with the first pixel interpolating part 11 in the horizontal direction and performing sharpening bilinear interpolation with the second pixel interpolating part 12 in the vertical direction and another interpolation pixel obtained by performing sharpening bilinear interpolation with the second pixel interpolating part 12 in the horizontal direction and performing cubic convolution with the first pixel interpolating part 11 in the vertical direction may be blended according to the size of the absolute values of the edge gradients in the horizontal and vertical directions, to thereby obtain an interpolation pixel value.

Further, in a case where the absolute value of the edge strength output from the overshoot area detecting part 10 (the larger one of the absolute values of the edge strengths of the reference pixels) is less than a predetermined first threshold $Th_1$, the interpolation pixel selecting part 13 selects an interpolation pixel interpolated by cubic convolution with the first pixel interpolating part 11. Further, in a case where the absolute value of the edge strength output from the overshoot area detecting part 10 is no less than a predetermined second threshold $Th_2$, the interpolation pixel selecting part 13 selects an interpolation pixel interpolated by sharpening bilinear interpolation with the second pixel interpolating part 12. Further, in a case where the absolute value of the edge strength output from the overshoot area detecting part 10 is no less than the first threshold $Th_1$ but less than the second threshold $Th_2$, an interpolation pixel value $P_{out}$ may be a value obtained by the following formula which blends an interpolation pixel value $P_{11}$ obtained by the cubic convolution with an interpolation pixel value $P_{12}$ obtained by the sharpening bilinear interpolation.

$$P_{out} = \frac{P_{11} \times (Th_2 - EP) + P_{12} \times (EP - Th_1)}{Th_2 - Th_1} \quad \text{[Formula 2]}$$

Figure 6:
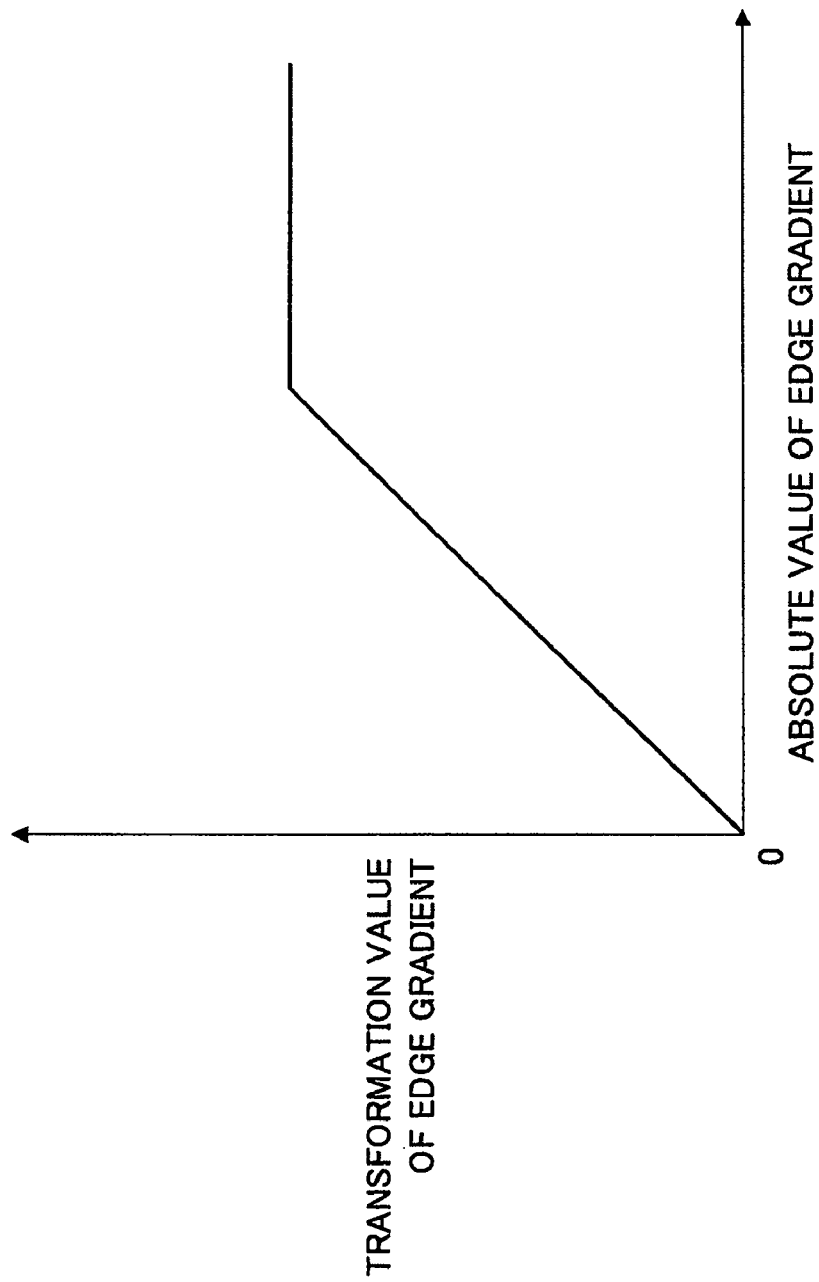
FIG. 6 is a schematic diagram illustrating an example of transforming the absolute value of an edge gradient to an edge gradient transformation value.
Figure 7:
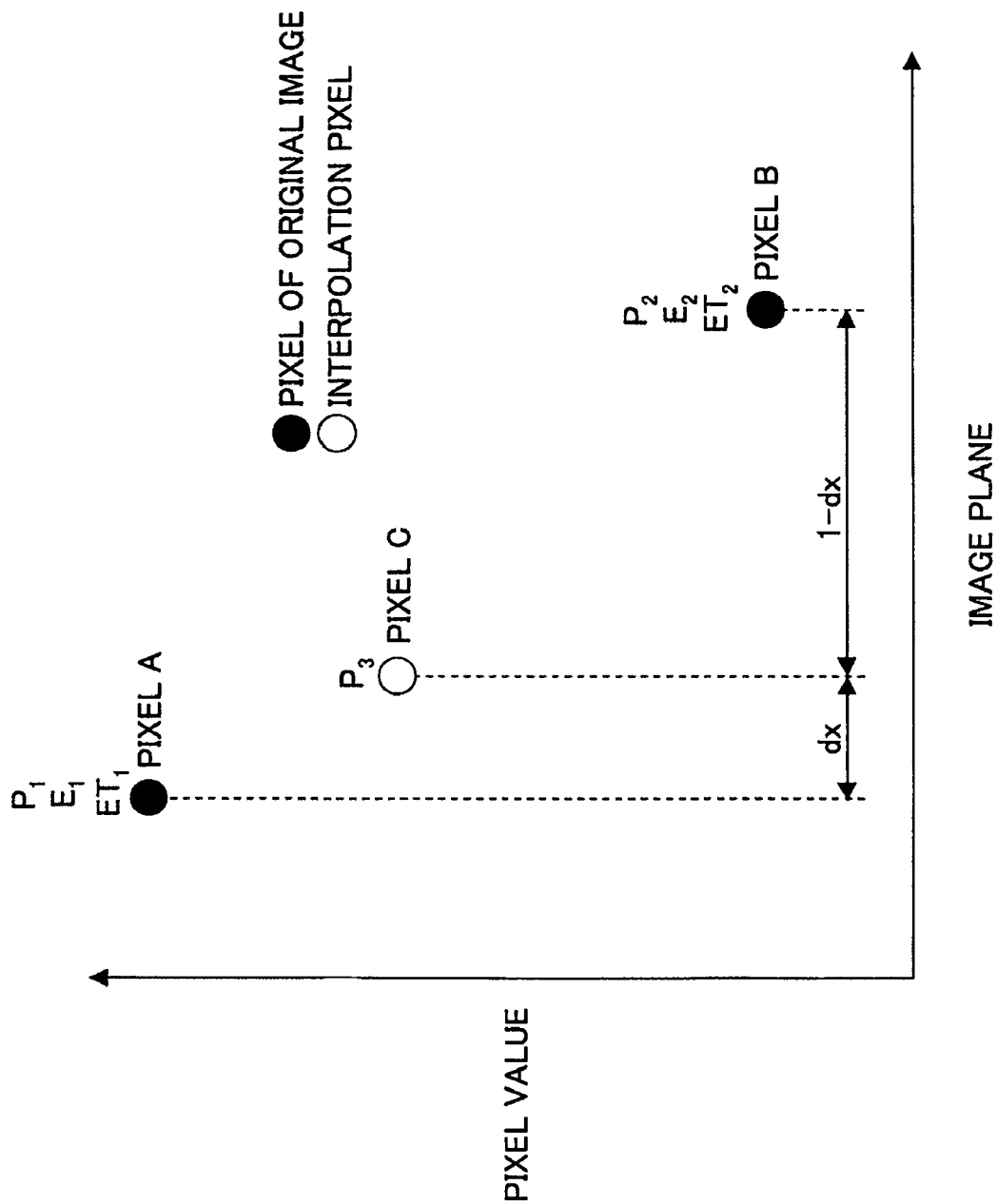
FIG. 7 is a schematic diagram illustrating an example of pixel values.

Alternatively, an interpolation pixel value may be obtained by calculating an edge gradient transformation value ET by transforming the absolute value of an edge gradient with a predetermined transformation method and using the calculated edge gradient transformation value VT and the distance between the interpolation reference pixel and the interpolation pixel. An example of transforming the absolute value of an edge gradient to an edge gradient transformation value is illustrated in FIG. 6. With reference to FIG. 7, assuming that "pixel C" represents an interpolation pixel, "pixel A" and "pixel B" represent reference pixels having the interpolation pixel C interposed therebetween, "$P_1$" represents a pixel value of the reference pixel A, "$P_2$" represents a pixel value of the reference pixel B, "$P_3$" represents a pixel value of the interpolation pixel C, "$E_1$" represents an absolute value of the edge gradient of the reference pixel A, "$E_2$" represents an absolute value of the edge gradient of the reference pixel B, "$ET_1$" represents an edge gradient transformation value of the interpolation pixel C, "$ET_2$" represents an edge gradient transformation value of the reference pixel B, and "dx" represents a ratio between the distance between the reference pixel A and the reference pixel B and the distance between the reference pixel A and the interpolation pixel C, the pixel value $P_3$ of the interpolation pixel C is calculated with the following formula.

$$P_3 = \frac{P_1 \times (1-dx) \times ET_2 + P_2 \times dx \times ET_1}{(1-dx) \times ET_2 + dx \times ET_1} \quad \text{[Formula 3]}$$

Second Embodiment

The second embodiment is a configuration that detects areas of an input image where a jaggy is generated and switches between an interpolation process using high order interpolation calculation (e.g., cubic convolution process) and an interpolation process using weighted interpolation (e.g., sharpening bilinear interpolation process) with respect to each area of the input image according to the detection result.

Figure 8:
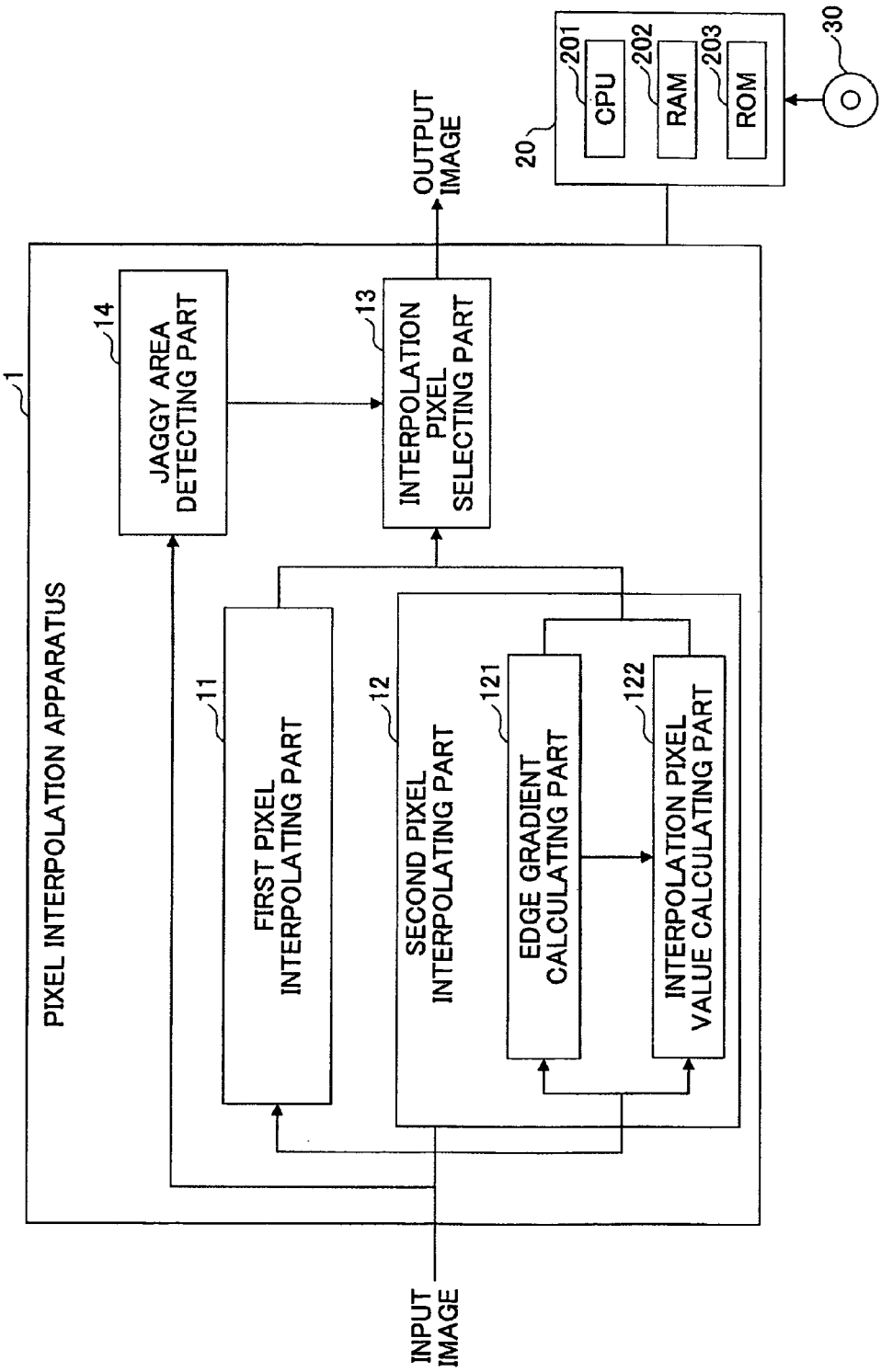
FIG. 8 is a schematic diagram illustrating a configuration of a pixel interpolation apparatus according to a second embodiment of the present invention.

FIG. 8 is a schematic diagram illustrating a configuration of a pixel interpolation apparatus 1 according to the second embodiment of the present invention.

In FIG. 8, the pixel interpolation apparatus 1 includes a jaggy area detecting part 14, a first pixel interpolating part 11, a second pixel interpolating part 12, and an interpolation pixel selecting part 13. Although the parts 11-14 of the pixel interpolation apparatus 1 are realized by electronic circuits, the parts 11-14 may be realized by a computer program executed with hardware resources of a computer 20 such as a CPU (Central Processing Unit) 201, a RAM (Random Access Memory) 202, a ROM (Read Only Memory) 203.

The jaggy area detecting part 14 detects an area of an input image determined to generate a jaggy or jaggies (jaggy area) in a case where an interpolation process using high order interpolation calculation (e.g., cubic convolution process) is performed on the input image. The jaggy area detecting part 14 calculates edge strength with respect to each pixel and determines which area of the input image is the jaggy area. In this embodiment, if the edge strength of any one of interpolation reference pixels surrounding an interpolation area (interpolation pixel) has an absolute value no less than a predetermined threshold, the interpolation area is determined as the jaggy area. In other words, if the edge strength of a reference pixel neighboring an interpolation pixel is no less than a predetermined threshold, the interpolation pixel is determined to be included in the jaggy area. On the other hand, if the edge strengths of all of the reference pixels neighboring an interpolation pixel are no greater than a predetermined threshold, the interpolation pixel is determined to be not included in the jaggy area.

The jaggy area detecting part 14 calculates the edge gradients with respect to each pixel in horizontal and vertical directions by using edge gradient detection filters as illustrated in FIGS. 3A and 3B. FIG. 3A illustrates edge gradient detection filters in the horizontal direction. FIG. 3B illustrates edge gradient detection filters in the vertical direction. The conditions for detecting the jaggy area may be set so that the absolute values of the edge gradients in the horizontal direction are larger than those in the vertical direction for all of the reference pixels of the interpolation pixel or the absolute values of the edge gradients in the vertical direction are larger than those in the horizontal direction for all of the reference pixels of the interpolation pixel, the signs (negative, positive) of the edge gradients in the horizontal direction and the edge gradients in the vertical direction are the same, and the larger one of the absolute value of the edge gradient in the horizontal direction and the vertical direction is no less than a predetermined threshold.

Returning to FIG. 8, the first pixel interpolating part 11 performs a high order interpolation process such as a cubic convolution process. Thereby, a value of an interpolation pixel (interpolation pixel value) is obtained by using the pixel values of the reference pixels surrounding the interpolation pixel and the distances from the interpolation pixel to the reference pixels. In the cubic convolution process, assuming that f (p−1), f (p), f (p+1), and f (p+2) represent the pixel values of the reference pixels (p being an integer satisfying a relationship of p<x<p+1 with respect to x axis coordinates of the interpolation pixel), the interpolation pixel value g (x) would be as follows:

$$g(x) = c((p-1)-x) \times f(p-1) + c(p-x) \times f(p) + c((p+1)-x) \times f(p+1) + c((p+2)-x) \times f(p+2).$$

However, it is assumed that:

$$c(t) = 1 - 2|t|^2 + |t|^3 (0 \leq |t| < 1) \ 4 - 8|t| + 5|t|2 - |t|3 (1 \leq |t| < 2) \ 0 \ (2 \leq |t|).$$

The second pixel interpolating part 12 includes an edge gradient calculating part 121 and an interpolation pixel value calculating part 122. The second pixel interpolating part 12 performs weighted interpolation. For example, the second pixel interpolating part 12 performs the sharpening bilinear interpolation process in which an interpolation process steeper than a regular bilinear interpolation process is performed.

The edge gradient calculating part 121 calculates an edge gradient with respect to an interpolation direction of reference pixels by using edge gradient detection filters (edge gradient detection filter in horizontal direction, edge gradient detection filter in vertical direction) as illustrated in FIGS. 3A and 3B and outputs the calculated edge gradient to the interpolation pixel calculating part 122.

The interpolation pixel calculating part 122 calculates an interpolation pixel value by using the edge gradient output from the edge gradient calculating part 121 and the pixel values of reference pixels. With reference to FIG. 4, assuming that "pixel C" represents an interpolation pixel, "pixel A" and "pixel B" represent reference pixels having the interpolation pixel C interposed therebetween, "$P_1$" represents a pixel value of the reference pixel A, "$P_2$" represents a pixel value of the reference pixel B, "$P_3$" represents a pixel value of the interpolation pixel C, "$E_1$" represents an absolute value of the edge gradient of the reference pixel A, "$E_2$" represents an absolute value of the edge gradient of the reference pixel B, and "dx" represents a ratio between the distance between the reference pixel A and the reference pixel B and the distance between the reference pixel A and the interpolation pixel C, the pixel value $P_3$ of the interpolation pixel C is calculated with the following formula.

$$P_3 = \frac{P_1 \times (1-dx) \times E_2 + P_2 \times dx \times E_1}{(1-dx) \times E_2 + dx \times E_1} \quad \text{[Formula 4]}$$

Returning to FIG. 8, the interpolation pixel selecting part 13 selects an interpolation process from the first pixel interpolating part 11 or the second pixel interpolating part 12 according to the detection result of the jaggy area detecting part 14. That is, in a case where the interpolation pixel is detected in a jaggy area, the interpolation pixel selecting part 13 selects an interpolation pixel interpolated by sharpening bilinear interpolation by the second pixel interpolating part 12. In a case where the interpolation pixel is not detected in the jaggy area, the interpolation pixel selecting part 13 selects an interpolation pixel interpolated by cubic convolution by the first pixel interpolating part 11.

In the pixel interpolation apparatus 1 illustrated in FIG. 8, two pixel interpolation processes are performed on the input image in parallel by the first and second pixel interpolating parts 11 and 12 to allow the interpolation pixel selecting part 13 to select an interpolation result from the first or second pixel interpolating parts 11 and 12. Alternatively, the interpolation pixel selecting part 13 may select an interpolation process beforehand and allow the selected interpolation process to be continued.

Figure 9:
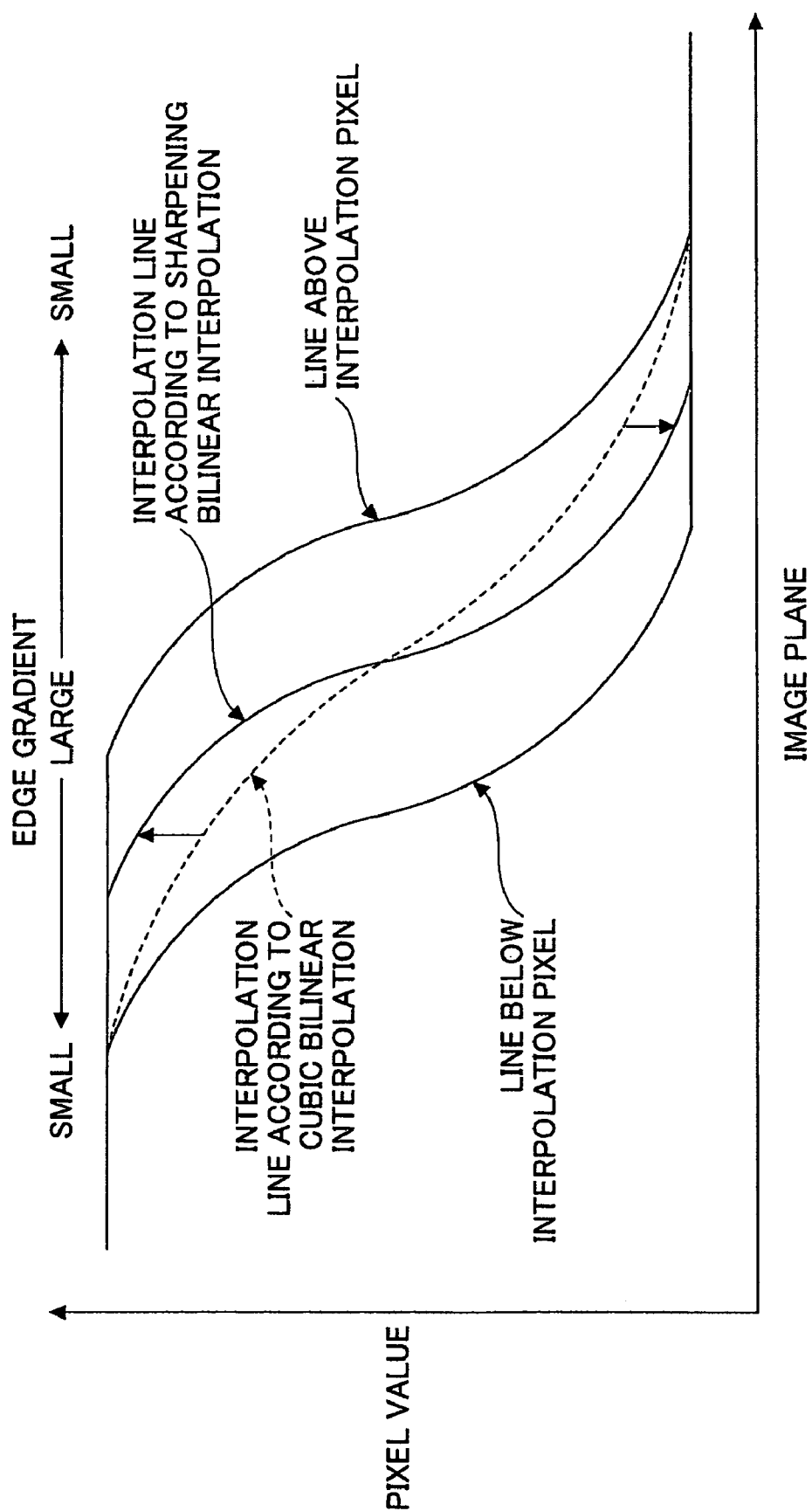
FIG. 9 is a schematic diagram illustrating a manner in which jaggies in an edge are reduced by performing a sharpening bilinear interpolation process according to an embodiment of the present invention.

Because a jaggy is generated in an area having a gradient existing in an edge part and a sharpening bilinear interpolation process requires reference pixels to have edge gradients of the same sign, an area is determined (detected) as a jaggy area when at least either one of the reference pixels has an edge gradient with an absolute value no less than a predetermined threshold and the edge gradients of the area have the same sign. With reference to FIG. 9, in a case where interpolation using cubic convolution is performed on a diagonal edge part in this area, the interpolated pixel would have a pixel value in the vicinity of a mid-point between a line above the interpolation pixel and a line below the interpolation pixel. Therefore, the gradient (inclination) of the edge of the line above the interpolation pixel becomes different compared to the gradient (inclination) of the edge of the line below the interpolation pixel. This difference of gradient is recognized as a jaggy(ies). On the other hand, because interpolation using sharpening bilinear interpolation increases the weight of the pixel having an edge gradient with a lower absolute value, the edge gradient of the line above the interpolation pixel and the edge gradient of the line below the interpolation pixel would be different between interpolation in a line direction and interpolation in a vertical direction. The interpolation pixel value becomes closer to the pixel value of the line above the interpolation pixel with respect to the left side of the center of the edge whereas the interpolation pixel value becomes closer to the pixel value of the line below the interpolation pixel value with respect to the right side of the center of the edge. Accordingly, the edge becomes steeper and becomes closer to the edge gradient (edge inclination) of the reference pixel. Therefore, the variance of the edge gradient (edge inclination) is restrained and generation of jaggy is prevented.

Further, in a case where the absolute value of the edge gradient output from the jaggy area detecting part 14 (the larger one of the absolute values of the edge gradients of the reference pixels) is less than a predetermined first threshold $Th_1$ the interpolation pixel selecting part 13 selects an interpolation pixel interpolated by cubic convolution with the first pixel interpolating part 11. Further, in a case where the absolute value of the edge gradient output from the jaggy area detecting part 14 is no less than a predetermined second threshold $Th_2$, the interpolation pixel selecting part 13 selects an interpolation pixel interpolated by sharpening bilinear interpolation with the second pixel interpolating part 12. Further, in a case where the absolute value of the edge strength output from the jaggy area detecting part 14 is no less than the first threshold $Th_1$ but less than the second threshold $Th_2$, an interpolation pixel value $P_{out}$ may be a value obtained by the following formula which blends an interpolation pixel value $P_{11}$ obtained by the cubic convolution with an interpolation pixel value $P_{12}$ obtained by the sharpening bilinear interpolation are blended.

$$P_{out} = \frac{P_{11} \times (Th_2 - ES) + P_{12} \times (ES - Th_1)}{Th_2 - Th_1} \quad \text{[Formula 5]}$$

Third Embodiment

The third embodiment is a configuration that detects areas of an input image where an overshoot and/or an jaggy is generated and switches between an interpolation process using high order interpolation calculation (e.g., cubic convolution process) and an interpolation process using weighted interpolation (e.g., sharpening bilinear interpolation process) with respect to each area of the input image according to the detection result.

FIG. 10 is a schematic diagram illustrating a configuration of a pixel interpolation apparatus 1 according to the third embodiment of the present invention.

In FIG. 10, the pixel interpolation apparatus 1 includes an overshoot area detecting part 10, a jaggy area detecting part 14, a first pixel interpolating part 11, a second pixel interpolating part 12, and an interpolation pixel selecting part 13. Although the parts 10-14 of the pixel interpolation apparatus 1 are realized by electronic circuits, the parts 10-14 may be realized by a computer program executed with hardware resources of a computer 20 such as a CPU (Central Processing Unit) 201, a RAM (Random Access Memory) 202, a ROM (Read Only Memory) 203.

The overshoot area detecting part 10 detects an area of an input image determined to generate overshoot (overshoot area) in a case where an interpolation process using high order interpolation calculation (e.g., cubic convolution process) is performed on the input image.

The jaggy area detecting part 14 detects an area of an input image determined to generate a jaggy or jaggies (jaggy area) in a case where an interpolation process using high order interpolation calculation (e.g., cubic convolution process) is performed on the input image.

The first pixel interpolating part 11 performs a high order interpolation process such as a cubic convolution process.

Thereby, a value of an interpolation pixel (interpolation pixel value) is obtained by using the pixel values of the reference pixels surrounding the interpolation pixel and the distances from the interpolation pixel to the reference pixels.

The second pixel interpolating part 12 includes an edge gradient calculating part 121 and an interpolation pixel value calculating part 122. The second pixel interpolating part 12 performs weighted interpolation. For example, the second pixel interpolating part 12 performs the sharpening bilinear interpolation process in which an interpolation process steeper than a regular bilinear interpolation process is performed.

In a case where the interpolation pixel is detected in an overshoot area according to a detection result output from the overshoot area detecting part 10 or where the interpolation pixel is detected in a jaggy area according to a detection result output from the jaggy area detecting part 14, the interpolation pixel selecting part 13 selects an interpolation pixel interpolated by sharpening bilinear interpolation by the second pixel interpolating part 12. That is, in this case, the sharpening bilinear interpolation process is selected as the interpolation process to be performed on the input image. In a case where the interpolation pixel is detected in neither the overshoot area nor the jaggy area, the interpolation pixel selecting part 13 selects an interpolation pixel interpolated by cubic convolution by the first pixel interpolating part 11. That is, in this case, the cubic interpolation process is selected as the interpolation process to be performed on the input image.

In the pixel interpolation apparatus illustrated in FIG. 10, two pixel interpolation processes are performed on the input image in parallel by the first and second pixel interpolating parts 11 and 12 to allow the interpolation pixel selecting part 13 to select an interpolation result from the first or second pixel interpolating parts 11 and 12. Alternatively, the interpolation pixel selecting part 13 may select an interpolation process beforehand and allow the selected interpolation process to be continued.

With the interpolation pixel selecting part 13 according to the third embodiment, assuming that "EP" represents the absolute value of the edge strength output from the overshoot area detecting part 10 (the larger one of the absolute values of the edge strengths of the reference pixels), "ES" represents the absolute value of the edge gradient output from the jaggy area detecting part 14, "Bep" represents a blend proportion of an interpolation pixel interpolated by the sharpening bilinear interpolation process according to edge strength, "Bes" represents a blend proportion of an interpolation pixel interpolated by the sharpening bilinear interpolation process according to edge gradient, "$Th_1$" and "$Th_2$" represent a predetermined threshold of the edge strength, and "$Th_3$" and "$Th_4$" represent a predetermined threshold of the edge gradient, the following relationships are satisfied:

$$Bep = \begin{cases} 0 & (EP < Th_1) \\ (EP - Th_1)/(Th_2 - Th_1) & (Th_1 \leq EP < Th_2) \\ 1 & (Th_2 \leq < EP) \end{cases}$$

$$Bes = \begin{cases} 0 & (ES < Th_3) \\ (ES - Th_3)/(Th_4 - Th_3) & (Th_3 \leq ES < Th_4) \\ 1 & (Th_4 \leq ES). \end{cases}$$

Further, assuming that "Bf" represents the one of Bep or Bes having a greater value, "$P_{11}$" represents an interpolation pixel value according to cubic interpolation, and "$P_{12}$" represents an interpolation pixel value according to sharpening bilinear interpolation, the interpolation pixel value $P_{out}$ would be as follows:

$$P_{out} = P_{11} \times (1 - Bf) + P_{12} \times Bf.$$

With the above-described embodiments of the pixel interpolation apparatus, the pixel interpolation method, and computer-readable recording medium, overshoot and jaggies, which tend to appear in the vicinity of an edge of an image or a part of an image having large gradient, can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A pixel interpolation apparatus for converting an image to a predetermined resolution, the apparatus comprising:
a first interpolating part configured to calculate a first interpolation pixel value by performing high order interpolation using pixel values of a plurality of first reference pixels and a distance between the plural first reference pixels and a first interpolation pixel;
a second interpolating part configured to calculate a second interpolation pixel value by performing weighted interpolation using pixel values of a plurality of second reference pixels, an edge gradient of the second reference pixels, and the distance between the second reference pixels and a second interpolation pixel,
wherein the second interpolating part is configured to increase a weight of one of the plurality of second reference pixels in which the distance with respect to the second interpolation pixel is shorter than the other plurality of second reference pixels and increase the weight of one of the plurality of second reference pixels in which the absolute value of the edge gradient is less than the other plurality second reference pixels;
an overshoot area detecting part configured to detect an overshoot area in the image,
wherein the overshoot area detecting part is configured to determine an area of the image as the overshoot area in a case where at least one of the first and second reference pixels neighboring the first and second interpolation pixels, respectively, has an edge strength no less than a redetermined threshold;
a jaggy area detecting part configured to detect a jaggy area in the image,
wherein the jaggy area detecting part is configured to determine an area of the image as the jaggy area in a case where the edge gradients of the first and second reference pixels neighboring the first and second interpolation pixels, respectively, have a same sign and at least one of the edge gradients has an absolute value no less than a redetermined threshold; and
an interpolation pixel selecting part configured to determine whether to perform the high order interpolation or the weighted interpolation according to detection results of the overshoot area detecting part and the jaggy area detecting part.

2. The pixel interpolation apparatus as claimed in claim 1, wherein the interpolation pixel selecting part is configured to perform weighted addition of the first interpolation pixel value calculated by the first interpolating part and the second interpolation pixel value according to edge strength.

3. The pixel interpolation apparatus as claimed in claim 1, wherein the interpolation pixel selecting part is configured to perform weighted addition of the first interpolation pixel value calculated by the first interpolating part and the second interpolation pixel value according to edge gradient.

4. A pixel interpolation method for converting an image to a predetermined resolution, the method comprising:

calculating a first interpolation pixel value by performing high order interpolation using pixel values of a plurality of first reference pixels and a distance between the plural first reference pixels and a first interpolation pixel;

calculating a second interpolation pixel value by performing weighted interpolation using pixel values of a plurality of second reference pixels, an edge gradient of the second reference pixels, and the distance between the second reference pixels and a second interpolation pixel, wherein a weight of one of the plurality of second reference pixels is increased in which the distance with respect to the second interpolation pixel value is shorter than the other plurality of second reference pixels and an increase in the weight of one of the plurality of second reference pixels in which the absolute value of the edge gradient is less than the other plurality second reference pixels;

detecting an overshoot area in the image, wherein the detected overshoot area is configured to determine an area of the image as the overshoot area in a case where at least one of the first and second reference pixels neighboring the first and second interpolation pixels, respectively, has an edge strength no less than a predetermined threshold;

detecting a jaggy area in the image, wherein the detected jaggy area is configured to determine an area of the image as the jaggy area in a case where the edge gradients of the first and second reference pixels neighboring the first and second interpolation pixels, respectively, have a same sign and at least one of the edge gradients has an absolute value no less than a predetermined threshold; and determining whether to perform the high order interpolation or the weighted interpolation according to results of the detecting of the overshoot area and the detecting of the jaggy area.

5. A computer-readable recording medium to which a program is recorded for causing a computer to execute a pixel interpolation method for converting an image to a predetermined resolution, the pixel interpolation method comprising:

calculating a first interpolation pixel value by performing high order interpolation using pixel values of a plurality of first reference pixels and a distance between the plural first reference pixels and a first interpolation pixel;

calculating a second interpolation pixel value by performing weighted interpolation using pixel values of a plurality of second reference pixels, an edge gradient of the second reference pixels, and the distance between the second reference pixels and a second interpolation pixel, wherein a weight of one of the plurality of second reference pixels is increased in which the distance with respect to the second interpolation pixel value is shorter than the other plurality of second reference pixels and an increase in the weight of one of the plurality of second reference pixels in which the absolute value of the edge gradient is less than the other plurality second reference pixels;

detecting an overshoot area in the image, wherein the detected overshoot area is configured to determine an area of the image as the overshoot area in a case where at least one of the first and second reference pixels neighboring the first and second interpolation pixels, respectively, has an edge strength no less than a predetermined threshold;

detecting a jaggy area in the image, wherein the detected jaggy area is configured to determine an area of the image as the jaggy area in a case where the edge gradients of the first and second reference pixels neighboring the first and second interpolation pixels, respectively, have a same sign and at least one of the edge gradients has an absolute value no less than a predetermined threshold; and determining whether to perform the high order interpolation or the weighted interpolation according to results of the detecting of the overshoot area and the detecting of the jaggy area.

* * * * *

UNITED STATES PATENT AND TRADEMARK OFFICE
CERTIFICATE OF CORRECTION

PATENT NO. : 8,175,417 B2  
APPLICATION NO. : 12/385708  
DATED : May 8, 2012  
INVENTOR(S) : Kohji Yamada et al.

Page 1 of 1

It is certified that error appears in the above-identified patent and that said Letters Patent is hereby corrected as shown below:

Column 12, Line 53, In Claim 1, delete "redetermined" and insert -- predetermined --, therefor.

Column 12, Line 62, In Claim 1, delete "redetermined" and insert -- predetermined --, therefor.

Signed and Sealed this
Twenty-eighth Day of August, 2012

David J. Kappos
*Director of the United States Patent and Trademark Office*